US009695046B2

(12) United States Patent
Hocke

(10) Patent No.: US 9,695,046 B2
(45) Date of Patent: Jul. 4, 2017

(54) METHOD FOR CLEANING CARBON NANOTUBES AND CARBON NANOTUBE SUBSTRATE AND USES THEREFOR

(71) Applicant: Covestro Deutschland AG, Leverkusen (DE)

(72) Inventor: Heiko Hocke, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/906,971

(22) PCT Filed: Jul. 18, 2014

(86) PCT No.: PCT/EP2014/065467
§ 371 (c)(1),
(2) Date: Jan. 22, 2016

(87) PCT Pub. No.: WO2015/011034
PCT Pub. Date: Jan. 29, 2015

(65) Prior Publication Data

US 2016/0167966 A1 Jun. 16, 2016

(30) Foreign Application Priority Data

Jul. 24, 2013 (DE) ........................ 10 2013 214 431

(51) Int. Cl.
*B08B 3/00* (2006.01)
*C01B 31/02* (2006.01)
*H01M 4/133* (2010.01)
*H01M 4/96* (2006.01)

(52) U.S. Cl.
CPC ........... *C01B 31/026* (2013.01); *H01M 4/133* (2013.01); *H01M 4/96* (2013.01)

(58) Field of Classification Search
CPC ...... C01B 31/00; C01B 31/026; H01M 4/133; H01M 4/96
USPC ......... 134/28, 19, 26, 27, 30, 34–36, 41, 43; 423/447.2, 447.1, 447.3; 977/742–754
See application file for complete search history.

(56) References Cited

U.S. PATENT DOCUMENTS 8,398,949 B2 3/2013 Meyer et al.
2007/0209093 A1 9/2007 Tohji et al.
2010/0276644 A1 11/2010 Wolf et al.
2015/0202662 A1* 7/2015 Li ....................... H01L 51/0025 134/42

FOREIGN PATENT DOCUMENTS

EP 56004 A2 7/1982
EP 205 556 B1 5/1995
EP 1375460 A2 1/2004
EP 2117012 A1 11/2009
GB 1469930 A 4/1977
WO WO-86/03455 A1 6/1986
WO WO-9839250 A1 9/1998
WO WO-2009036877 A2 3/2009
WO WO-2009/080204 A1 7/2009

OTHER PUBLICATIONS

International Search Report for PCT/EP2014/065467 mailed Oct. 30, 2014.

* cited by examiner

*Primary Examiner* — Duy Deo
*Assistant Examiner* — Maki Angadi
(74) *Attorney, Agent, or Firm* — Drinker Biddle & Reath LLP

(57) ABSTRACT

The invention relates to a method for cleaning carbon nanotubes comprising the following steps: provision of a carbon nanotube substrate, first washing of the carbon nanotube substrate by means of an acid and second washing of the carbon nanotube substrate by means of a solution, wherein the solution has replacement anions of at least one of the acid radical anions of the acid of different type, and the substance amount fraction of the replacement anions in the solution is greater than the substance amount fraction of the anions in the solution corresponding to the acid radical anions of the acid. The invention further relates to a carbon nanotube substrate which can be obtained by such a method.

18 Claims, No Drawings

METHOD FOR CLEANING CARBON NANOTUBES AND CARBON NANOTUBE SUBSTRATE AND USES THEREFOR

CROSS-REFERENCE TO RELATED APPLICATIONS

This application is a national stage application (under 35 U.S.C. §371) of PCT/EP2014/065467, filed Jul. 18, 2014, which claims benefit of German Application No. 102013214431.8, filed Jul. 24, 2013. Both of which are incorporated herein by reference in their entirety.

BACKGROUND OF THE INVENTION

The invention relates to a process for cleaning carbon nanotubes. The invention further relates to a carbon nanotube substrate obtainable by this process and also uses thereof.

BRIEF SUMMARY OF THE INVENTION

According to the prior art, carbon nanotubes are mainly cylindrical carbon tubes having a diameter in the range from 1 to 100 nm and a length which is a multiple of the diameter. These tubes consist of one or more layers of ordered carbon atoms and have a core having a different morphology. These carbon nanotubes are also referred to as, for example, "carbon fibrils" or "hollow carbon fibers".

Carbon nanotubes have been known for a long time in the technical literature. Although Iijima (publication: S. Iijima, Nature 354, 56-58, 1991) is generally credited with being the discoverer of carbon nanotubes (also referred to as nanotubes or CNTs for short), these materials, in particular fibrous graphite materials having a plurality of graphene layers, were known as early as the 1970s or early 1980s. Tates and Baker (GB 1469930A1, 1977 and EP 0056 004A2, 1982) first described the deposition of very fine fibrous carbon from the catalytic decomposition of hydrocarbons. However, the carbon filaments produced on the basis of short-chain hydrocarbons are not characterized in more detail in respect of their diameter.

The production of carbon nanotubes having diameters of less than 100 nm was described for the first time in EP 205 556B1 or WO 86/03455A1. These were produced using light (i.e. short- and medium-chain aliphatic or monocyclic or bicyclic aromatic) hydrocarbons and an iron-based catalyst over which carbon carrier compounds are decomposed at a temperature above 800-900° C.

The methods known today for producing carbon nanotubes encompass electric arc processes, laser ablation processes and catalytic processes. In many of these processes, carbon black, amorphous carbon and fibers having large diameters are formed as by-products. Among catalytic processes, a distinction can be made between the deposition on introduced catalyst particles and deposition on metal sites which are formed in-situ and have diameters in the nanometer range (known as flow processes). In the production route via catalytic deposition of carbon from hydrocarbons which are gaseous under reaction conditions (hereinafter referred to as CCVD; catalytic carbon vapor deposition), acetylene, methane, ethane, ethylene, butane, butene, butadiene, benzene and further carbon-containing starting materials have been mentioned as possible carbon donors.

The catalysts generally comprise metals, metal oxides or decomposable or reducible metal components. For example, Fe, Mo, Ni, V, Mn, Sn, Co, Cu and others are mentioned in the prior art as metals coming into question for catalysts. Although the individual metals usually have, even alone, a tendency to catalyze the formation of nanotubes, according to the prior art, high yields of nanotubes and small proportions of amorphous carbons are advantageously achieved using metal catalysts which contain a combination of the abovementioned metals.

Particularly advantageous catalyst systems are, according to the prior art, based on combinations containing Fe, Co or Ni. The formation of carbon nanotubes and the properties of the tubes formed depend in a complex way on the metal component or combination of metal components used as catalyst, the support material used and the interaction between catalyst and support, the feed gas and feed gas partial pressure, an addition of hydrogen or further gases, the reaction temperature and the residence time and the reactor used. Optimization is a particular challenge for an industrial process.

It should be noted that the metal component used in CCVD and referred to as catalyst is consumed during the course of the synthesis process. This consumption is attributable to deactivation of the metal component, e.g. as a result of deposition of carbon on the entire particle which leads to complete covering of the particle (this is known as "encapping" to those skilled in the art). Reactivation is generally not possible or not economically feasible. A maximum of only a few gram of carbon nanotubes are often obtained per gram of catalyst, with the catalyst here comprising the totality of support and active catalyst metal(s) used. Owing to the indicated consumption of catalyst and the expense of separating off the catalyst residue from the finished carbon nanotube product, a high yield of carbon nanotubes based on the catalyst used is an important requirement to be met by catalyst and process.

Typical structures of carbon nanotubes are those of the cylinder type (tubular structure). In the case of cylindrical structures, a distinction is made between single-wall carbon nanotubes (SWCNT) and multi-wall carbon nanotubes (MWCNT). Customary processes for producing them are, for example, electric arc processes (arc discharge), laser ablation, chemical deposition from the vapor phase (CVD process) and catalytic chemical deposition from the vapor phase (CCVD process).

Cylindrical carbon nanotubes of this type can likewise be produced by an electric arc process. Iijima (Nature 354, 1991, 56-8) reports the formation of carbon tubes which consist of two or more graphene layers which are rolled up to form a seamlessly closed cylinder and are nested within one another by means of an electric arc process. Depending on the rolling-up vector, chiral and achiral arrangements of the carbon atoms along the longitudinal axis of the carbon fiber are possible.

Carbon nanotubes having a scroll structure in which one or more graphite layers consisting of two or more superposed graphene layers form a rolled structure can be produced by the process described in WO 2009/036877 A2.

Further known structures of carbon nanotubes are described in a review by Milne et al. (Milne et al. Encyclopedia of Nanoscience and Nanotechnology, 2003, Volume X, pp. 1-22; ISBN 1-58883-001-2), and are the "herringbone" structure, the cup-stacked structure and the stacked structure, the bamboo structure and the platelet structure. Carbon nanofibers can likewise be produced by electrospinning of polyacrylonitrile and subsequent graphitization (Jo et al. *Macromolecular Research,* 2005, Volume 13, pp. 521-528).

With the increasing industrial and technological importance of carbon nanotubes, the requirements in respect of the nature and the properties of the carbon nanotubes or of the carbon nanotube powers composed of these have also increased. Thus, for example, carbon nanotube powders having a high purity or a prescribed impurity profile which can be tolerated in the later use are being demanded.

For the purposes of the present invention, an impurity profile is a series of limit values for various impurities, in particular for various metals (or metal ions) such as Fe, Co, Mo, Ni and various anions such as nitrate, sulfate or chloride anions. The tolerable limit values can be different depending on the use and type of impurity.

Among impurities, especially metals, a distinction has to be made between the impurities in the interior of the CNT, i.e. these are located in the interior hollow space of the carbon nanotubes and are enclosed by the graphene or graphite layers of the CNT ("encapped"), and the impurities present outside the CNT. Due to the encapsulation, the metals in the interior of the CNT are not accessible for solvents, polymers, etc., and are also fixed. These enclosed metal radicals therefore cannot interact and in most applications do not display any negative effects. They can therefore be tolerated and remain in the product.

The situation is different for impurities which are located outside the CNT and, for example, adhere to the latter. These exterior impurities can come into contact with solvents or polymers and can thereby trigger chemical reactions such as decompositions and polymer degradation. In addition, these exterior impurities are not strongly fixed and can therefore be dissolved and migrate. There is therefore great interest in eliminating or decreasing the amount of, in particular, the impurities outside the carbon nanotubes.

Furthermore, there is general interest in doped carbon nanotubes in the case of which the properties of the tubes have been modified by doping of the carbon layers with foreign atoms such as nitrogen or boron. Doped carbon nanotubes are, for example, promising candidates for further-miniaturized electronic circuits in the nanometer range, as electrode materials or for applications in catalysis. In this context, too, the purity and the impurity profile of the CNT plays an important role for the later use.

In the prior art, Oberlin, Endo and Koyama have described a way of producing cylindrical carbon nanotubes (Carbon 14, 1976, 133). Here, aromatic hydrocarbons such as benzene are reacted over a metal catalyst at about 1100° C. in an entrained-flow reactor. Here, carbon nanotubes having a graphitic core which is covered with a coating of amorphous carbon are formed.

A further process for producing carbon nanotubes, in which hydrocarbons are reacted at temperatures above 800-1000° C. over an iron-containing catalyst, is described in EP 0 205 556 A1 (Hyperion Catalysis International).

A process for producing doped carbon nanotubes is known from WO 2009/080204 A1. In this process, catalytic growth of nitrogen-doped carbon nanotubes occurs in a fluidized bed.

In the abovementioned examples, the catalyst or residues thereof generally remain as impurity (within and outside the CNT) in the finished product.

Apart from specific requirements in respect of the diameter distribution or doping of carbon nanotubes, particular potential possible uses for carbon nanotubes impose particular requirements in respect of the purity and the electrical conductivity of the carbon nanotubes. For example, the use of carbon nanotubes in the electronics sector, for example in the production of rechargeable lithium ion batteries or of electronic circuits and also of packaging for such circuits, requires a very high purity and a good electrical conductivity of the carbon nanotubes.

For the present purposes, a high purity means that the carbon nanotube substrate used for the respective application contains only very small proportions of foreign substances, for example catalyst residues, anions or cations, outside the CNT.

In the prior art, the purity of carbon nanotubes is improved by treating them after the production process at very high temperatures of, in particular, more than 2000° C. in order to vaporize the catalyst residues remaining in the carbon nanotube substrate. In this process, both the exterior impurities and the metal residues in the interior of the CNT can be decreased or eliminated. However, this process is technically complicated and expensive. The cleaning of the CNTs is more frequently carried out by washing with an aqueous acid and/or with deionized water. It has been found that particular impurities contaminating the carbon nanotubes, namely metal residues, in particular, of the catalysts used in the synthesis of the carbon nanotubes, which are located outside the CNT, can be removed quite well and in a technically simple way by washing.

In the abovementioned washing operation, acids such as dilute nitric acid, dilute hydrochloric acid or dilute sulfuric acid are used. These acids are inexpensive and therefore advantageous for an industrial cleaning process for economic reasons. Furthermore, hydrofluoric acid has also been used, but this is significantly more expensive, more difficult to handle and some metal fluorides are only sparingly soluble in hydrofluoric acid. The use of organic acids such as citric acid, acetic acid, oxalic acid and similar acids is likewise known, but in the case of these acids the reaction time is frequently longer and the solubility of the metal salts is frequently lower.

It has also been found, however, that the purity of the carbon nanotubes which have been washed in this way is still not satisfactory for particular applications, in particular electronic and electrochemical applications.

Depending on the planned use of the carbon nanotubes, contamination with particular substances can be more problematical than with other substances. For this reason, an appropriate property profile for different applications can accordingly have different limit values. For example, in the production of rechargeable lithium ion batteries, chloride ions are a great problem while lithium or fluoride ions are unproblematical since they are in any case used in the electrolyte. The impurity profile for carbon nanotubes for these applications therefore typically has a lower limit value for chloride ions than for lithium or fluoride ions.

For this reason, the purity of carbon nanotubes required for a particular application is therefore generally not a very small amount of foreign substances overall but instead a very small amount of the specific foreign substances which interfere in the respective application. The purity is therefore determined in terms of an appropriate impurity profile of foreign substances outside the CNT, which is determined by the application.

Proceeding from this prior art, it is an object of the present invention to provide a process for cleaning carbon nanotubes, by means of which carbon nanotube substrates having a high purity or having a prescribed impurity profile of foreign substances present outside the CNT can be made available inexpensively. Furthermore, it is an object of the invention to provide a corresponding carbon nanotube substrate having a high purity or having a prescribed impurity profile and also uses for this.

This object is, according to the invention, at least partly achieved by a process for cleaning carbon nanotubes, which comprises the following steps:

a) provision of a carbon nanotube substrate, b) first washing of the carbon nanotube substrate with an acid, in particular an aqueous acid, where the acid has at least one type of acid anions A1, and b2) optionally intermediate washing of the product from step b) with additive-free solvent, and c) second washing of the carbon nanotube substrate with a solution, where the solution comprises replacement anions A2 of at least one type different from the acid anions A1 of the acid in step b) and the mole fraction of the replacement anions A2 in the solution is greater than the mole fraction of acid anions A1 in the same solution, and c2) optionally further washing of the product from step c) with additive-free solvent, and d) isolation of the cleaned carbon nanotubes.

In the context of the present invention, it has been found that the purity of carbon nanotubes which is insufficient for some electronic applications is predominantly attributable to the carbon nanotube substrates which have been cleaned by means of the cleaning processes known from the prior art having a quite high anion concentration, in particular amounts of nitrate ions, chloride ions or sulfate ions which interfere for some industrial applications.

DETAILED DESCRIPTION OF THE INVENTION

Experiments have shown that although washing with acid (step b) can quite effectively remove the metals or metal ions from the carbon nanotube substrates, the anion concentrations, in particular nitrate ion, chloride ion or sulfate ion concentrations, can be removed only insufficiently even by repeated washing with deionized water as in the optional step b2). Additional washing with deionized water or washing at different temperatures was able to achieve a certain further reduction in the anion concentration, but not to significantly lower residual contents like, for example, about 1000 ppm of chloride. These residual anion contents have, however, been found to still be too high for sensitive applications in the field of electronics and in the production of rechargeable lithium ion batteries and other electrochemical applications because of the secondary reactions associated therewith.

In contrast, the above-described process of the invention makes it possible to provide carbon nanotube substrates which have not only a low metal ion concentration but also a low concentration of anions which interfere in the respective application, in particular nitrate ions, chloride ions and sulfate ions originating from the first washing (step b) with the acid.

In the context of the invention, it has been recognized that the concentration or anions which are disadvantageous for particular applications in the carbon nanotube substrate can be reduced by replacing these anions (A1) by other anions (A2) which are less problematical or unproblematical for the particular application by means of the second washing c) with a replacement anion-containing solution. In the case of carbon nanotube substrates which are to be used for the production of rechargeable lithium ion batteries, problematical chloride ions, for example, can be replaced by unproblematical fluoride ions in this way.

Experiments have shown that a significant decrease in the acid anions A1 (in particular Cr, $SO_4^{2-}$, $NO_3^-$) remaining in the carbon nanotube substrate after the first washing b) can be achieved by a second washing (step c) with a solution comprising replacement anions A2 of a type different from the acid anions A1 of the acid, where the mole fraction of the replacement anions A2 in the solution is greater than the mole fraction of the acid anions A1 in the same solution.

As a result of the higher mole fraction of the replacement anions A2 in the solution, an anion exchange in which at least part of the interfering acid anions A1 are replaced by replacement anions different from the acid anions can occur in the carbon nanotube substrate during the second washing c). In this way, the concentration of the interfering acid anions in the carbon nanotube substrate can be reduced in a targeted manner. Due to types of anions which are noncritical for the planned use of the carbon nanotubes being preferably used as replacement anions, there are no negative effects resulting from the simultaneous increase in the concentration of the replacement anions in the carbon nanotube substrate.

As replacement anions, it is possible to use anions of one or more types. Preferred examples of replacement anions are fluoride ions, hexafluorophosphate ions, tetrafluoroborate, citrate ions, carbonate, hydrogencarbonate, hydroxide ions or mixtures thereof. The mole fraction of the replacement anions A2 (in the case of more than one type of replacement anions: the cumulated mole fraction of the various types of replacement anions) in the solution provided is greater than the mole fraction of the anions A1 corresponding to the acid anions in the same solution (in the case of more than one type of acid anions: the cumulated mole fraction of the anions corresponding to the various acid anions). As a result of this, the total concentration of the acid anions A1 in the carbon nanotube substrate is reduced during the second washing.

The solution for the second washing c) preferably comprises anions A1 corresponding to the acid anions in concentrations of not more than unavoidable impurities, in particular in a mole fraction of less than 100 000 ppm, in particular less than 10 000 ppm, particularly preferably less than 1000 ppm. In this way, a greater reduction in the concentration of the acid anions can be achieved in the second washing c).

The second washing (step c) with the solution is, in the process described, carried out only after the first washing with the acid (step b). In this way, metal ions are firstly largely removed from the carbon nanotubes, for example to a total concentration of less than 2000 ppm, preferably less than 1000 ppm, and per metal ion type preferably less than 200 ppm, in the first washing, so that precipitation of metal salts in the form of, for example, fluorides, hydroxides, oxides and the like and thus renewed contamination of the carbon nanotube substrate preferably does not occur or occurs to at most a very small extent during the subsequent second washing c).

In a preferred embodiment of the process, the mole fraction of the replacement anions A2 based on the totality of the anions A1 and A2 in the solution for step c) is more than 50 mol %, preferably more than 70 mol %, more preferably more than 90 mol %, in particular more than 95 mol %. As a result of the higher mole fractions of the replacement anions, the acid anions in the carbon nanotube substrate can be replaced to a greater degree. In particular, a mole fraction of the replacement anions A2 of more than 90 mol %, in particular more than 95 mol %, led to very good results in experiments.

The second washing c) can generally be carried out by means of acids, bases or salt solutions, or by means of buffer solutions.

In a further preferred embodiment of the process, an alkali solution or a salt solution is used as solution for the second washing c). It has been found that the replacement of the acid anions A1 can be brought about by a second washing with an alkali solution or with a salt solution.

In the second washing with an acid, the acid anions of this acid form the replacement anions for replacement of the acid anions present in the carbon nanotube substrate after the first washing. The composition of the acid used for the second washing c) differs from the composition of the acid used for the first washing b). The acid for the first washing b) can be optimized for the removal of the metal ions, while the acid for the second washing c) can be selected with a view to the unproblematical nature of the acid anions for the planned use of the carbon nanotubes.

In the second washing c) with an alkali solution, the hydroxide ions, for example, optionally also the carbonate or hydrogencarbonate ions in the case of basic compounds, represent the replacement anions A2 for replacement of the acid anions A1 present in the carbon nanotube substrate after the first washing. In the case of second washing with a salt, the anions of the dissociated salts in the solution represent the replacement anions A2 for replacement of the acid anions A1 present in the carbon nanotube substrate after the first washing.

In the second washing, preference is given to at least 50% by weight, preferably at least 70% by weight, in particular at least 90% by weight, of the acid anions A1 in the carbon nanotube substrate being reduced and/or replaced by replacement anions A2.

In a further embodiment of the process, the solution for the second washing c) contains replacement anions A2 of at least one type of the following group: fluoride- or fluorine-containing anions, phosphorus- or boron-containing anions, in particular fluoride ions or hexafluorophosphate ions, anions of organic acids, in particular carboxylate ions, preferably citrate, oxalate, acetate and formate ions or a mixture thereof. It has been found that, in particular, the concentration of chloride ions in the carbon nanotube substrate can be significantly reduced by means of these anions. When a corresponding hydroxide ion-containing solution is used, a significant decrease in anions, in particular $NO_3^-$, $Cl^-$ and/or $SO_4^{2-}$, in the carbon nanotube substrate which has been previously washed with aqueous acid can be achieved. When using these solutions, total acid anion concentrations A1 in the carbon nanotube substrate of less than 900 ppm, in particular less than 500 ppm and even less than 200 ppm or at least replacement of the interfering anion such as chloride to an extent of more than 50% by weight, were achieved.

In a further embodiment of the process, the solution for the second washing c) contains cations of at least one type from the following group: cations of ammonium compounds, e.g. ammonium cations, alkyl- and aryl-substituted ammonium cations, and alkali metal or alkaline earth metal cations, in particular lithium, sodium, potassium or barium cations, and mixtures thereof. In a second washing with an alkali solution or a salt, cations which are unproblematical for the planned use of the carbon nanotubes, in particular the abovementioned cations, are preferably selected as cations of the alkali solution or the salt. In this way, contamination of the carbon nanotube substrate by problematical cations in the second washing c) can be prevented. In particular, it is possible to prevent the concentration of the cations removed from the carbon nanotube substrate in the first washing b) from increasing again.

Particularly preferred salts for the washing solution in step c) are: fluorides, tetrafluoroborates, hexafluorophosphates, carbonates, hydrogencarbonates, acetates, citrates, formates, oxalates, . . . of the alkali metal or alkaline earth metals, preferably of Li, Na, K or barium, and also of ammonium or alkyl- and/or aryl-substituted ammonium. Very particular preference is given to sodium fluoride, potassium fluoride, sodium hydrogendifluoride and potassium hydrogendifluoride.

In a further embodiment of the process, at least one solvent from the following group: water, alcohols, ethers, ketones, nitriles, amides, halogenated compounds and esters, in particular water, methanol, ethanol, propanols, butanols, glycols, acetone, methyl ethyl ketone, diethyl ether, tetrahydro furan, methyl tert-butyl ether, acetonitrile, dimethylformamide, N-methylpyrrolidone, butyl acetate, ethyl acetate, methoxypropyl acetate, trichloromethane, trichloroethylene and/or tetrachloromethane, or a mixture thereof is used as solvent for the first washing b) and/or for the second washing c) and also for the optional washing steps b2) and c2). Particularly when using a salt solution in the second washing c), a nonaqueous solvent can be necessary, depending on the solubility of the salt compound. However, for reasons of costs, safety and environmental protection, water is the particularly preferred solvent. An additive-free solvent is a selected solvent, in particular from the abovementioned group, which is used either alone or in admixture with other solvents but to which no further additives such as salts, acids or alkalis have been added.

In a further embodiment of the process, an aqueous alkali metal or alkaline earth metal hydroxide solution, in particular an aqueous sodium hydroxide (NaOH) solution, an aqueous potassium hydroxide (KOH) solution, a lithium hydroxide solution or a mixture thereof, is used as solution for the second washing c). When using these alkalis, acid anion concentrations of less than 900 ppm, in particular less than 500 ppm and even less than 200 ppm or at least replacement of the interfering anion such as chloride to an extent of more than 50% by weight, were achieved in experiments.

In a further embodiment of the process, the solution for the second washing c) has a molar concentration of from 0.0001 to 10 mol/l, preferably from 0.001 to 1 mol/l. At a lower cation or anion concentration, the replacement reaction of the anions takes too long or proceeds only to an unsatisfactory extent. At a higher cation or anion concentration, the process has poor economics (for example because of the costs for the salts in the case of a salt solution) and the after-washing consumes a great deal of time, water or solvent and energy.

In a further embodiment of the above-described process, an aqueous organic acid or a mineral acid, preferably aqueous hydrochloric acid, aqueous sulfuric acid, aqueous nitric acid or a mixture thereof, is used as acid for the first washing b). When using potentially oxidizing acids such as sulfuric or nitric acid, the dilution with water is preferably selected so that firstly the dissolution of the catalyst residues occurs in an acceptable time frame and secondly the carbon nanotubes are not oxidized. In order to avoid oxidation of the carbon nanotubes, the acid concentration is, in particular, less than 15% by weight when using nitric acid and in particular less than 50% by weight in the case of sulfuric acid. At these concentrations, the first washing b) can be carried out within an acceptable time even at room temperature.

Experiments have shown that the metal ions in the carbon nanotube substrate can be virtually completely removed by means of a first washing with the abovementioned acids, so that precipitation of metal salts or oxides or hydroxides, for example cobalt oxide, iron oxide, aluminum oxide, manganese oxide or magnesium oxide, cannot occur during the second washing with the aqueous solution.

In a further embodiment of the process, an aqueous acid having a concentration of >1% by weight, preferably >5% by weight and particularly preferably >10% by weight, is used as acid for the first washing b). If the concentration of the acid is lower, the reaction times for dissolution of the metal compounds are too long and not economically feasible. In the case of oxidizing acids, the concentration is preferably so low as technically and economically feasible. Depending on the washing temperature and time, a concentration of <50% by weight, preferably <30% by weight and in particular <15% by weight, can be used as a guideline in the case of oxidizing acids. If the acid has a higher concentration, undesirable secondary reactions, e.g. oxidation of the carbon nanotubes, can occur in the case of oxidizing acids and/or the neutralization with deionized water requires an unnecessarily large number of washing steps and thus time and water or solvent.

In a further embodiment of the process, the carbon nanotubes are present in agglomerated form in the carbon nanotube substrate. The agglomerates preferably have an average diameter of from 0.01 mm to 10 mm, preferably from 0.05 mm to 6 mm and particularly preferably from 0.1 mm to 2 mm. If the agglomerates are larger than 10 mm, they can break up too quickly and the fines can become densified to form a dense fillet cake or solid sediment. If the agglomerate diameter is too low, a solid sediment or a dense filtercake can likewise be formed. In this case, mass transfer, for example during washing or during neutralization, is greatly hindered and the processes do not proceed to completion or require considerably more time.

In a further embodiment of the process, the total metal ion concentration in the carbon nanotube substrate after the first washing or before the second washing is less than 2000 ppm, preferably less than 1000 ppm, in particular less than 500 ppm and/or for each type of metal ion less than 200 ppm, in particular less than 100 ppm. In this way, precipitation of metal salts during the second washing can be largely prevented, so that the metal salt concentration in the carbon nanotube substrate after the second washing c) is a correspondingly low concentration of less than 2000 ppm, preferably less than 1000 ppm, in particular less than 500 ppm, and/or for each type of metal ion less than 200 ppm, in particular less than 100 ppm.

In a further embodiment of the process, the process comprises an intermediate washing step b2) between the first washing b) and the second washing c) and/or a third washing step c2) after the second washing, where the intermediate washing b2) or the third washing c2) is preferably carried out using a pH-neutral solution, in particular deionized water. The third washing c2) and/or the intermediate washing b2) can remove excess acid, alkali and/or salt residues from the carbon nanotube substrate, so that a carbon nanotube substrate having a high purity can be provided. Possible solvents are, in particular, the solvents described above for the first and second washing c). Depending on the solubility of the salt compounds to be removed, a nonaqueous solvent can be necessary, but preference is given to water.

In a further embodiment of the process, the carbon nanotube substrate is dried in a drying step after the second washing c) and/or after the third washing c2). In this way, solvent residues can be removed from the carbon nanotube substrate.

In a further embodiment of the process, the first washing (step b) is carried out at a temperature of at least 10° C., preferably at least 50° C., more preferably at least 65° C., in particular at least 90° C. At lower temperatures, the reaction times for dissolution of the metal compounds in the carbon nanotube substrate are too long, so that the total washing time becomes too long and thus not economically feasible. An upper limit to the temperature for the first washing b) is imposed by the boiling point of the solution used for washing.

In a further embodiment of the process, the first washing b) is carried out under atmospheric pressure since this makes it possible for the working step to be carried out economically. In an alternative embodiment of the process, the first washing b) is carried out at superatmospheric pressure, i.e. a pressure of more than 1 bar. In this way, it is possible to increase the boiling point of the solution used for washing and thus the washing temperature. The reaction times are shortened in this way, so that short washing times are made possible.

The second washing c) and/or the third washing c2) and/or the intermediate washing b2) are preferably carried out at a temperature of greater than 0° C. For economic reasons, these washing steps can, in particular, be carried out at ambient temperature.

In a further embodiment of the process, the first washing (step b) for removal of the metal compounds is carried out for a time of from 0.25 hour to 48 hours, preferably from 1 hour to 24 hours, particularly preferably from 2 hours to 8 hours. At shorter washing times, in particular at washing times of less than 0.25 hour, the catalyst residues in the carbon nanotube substrate are only incompletely dissolved, so that a large amount of impurities remains in the washed carbon nanotube substrate. If the washing times are too long, the process is not economically feasible.

The above-described object is also at least partly achieved according to the invention by a carbon nanotube substrate obtainable by one of the above-described processes, where the concentration of nitrate ions, chloride ions and/or sulfate ions in the carbon nanotube substrate is in each case less than 900 ppm, preferably less than 500 ppm, in particular less than 200 ppm. It has been recognized that, in particular, the above-described processes make it possible to provide carbon nanotube substrates which have not only a low metal ion concentration but also a particularly low concentration of anions which interfere in some applications. In addition, the carbon nanotube substrate preferably has a total metal ion concentration of less than 2000 ppm, preferably less than 1000 ppm, and/or, based on each individual type of metal ion, less than 200 ppm, preferably less than 100 ppm.

The above-described object is also at least partly achieved according to the invention by the use of one of the carbon nanotube substrates described above for producing composites for packaging or transport materials for electronic components or for producing batteries, in particular rechargeable lithium ion batteries, for producing electrodes for electrochemical processes or for producing fuel cells. The carbon nanotube substrates obtainable by means of the above-described processes have a purity or an impurity profile which satisfies the demanding requirements which carbon nanotubes have to meet for the production of composites for packaging or transport materials for electronic components or for the production of batteries, in particular rechargeable lithium ion batteries, electrodes and fuel cells. These carbon nanotube substrates are thus particularly useful for the abovementioned applications.

Further advantages and features of the present invention can be derived from the following description of illustrative embodiments.

To demonstrate the properties of the invention, a series of experiments were carried out according to illustrative embodiments of the invention and according to comparative examples. These are described below:

Commercially available carbon nanotubes (Baytubes® C 150 P, manufacturer Bayer MaterialScience AG) were used as carbon nanotube substrate for the experiments. This carbon nanotube material is sold in the state as produced, i.e. without preliminary cleaning and including the catalyst residues remaining in the carbon nanotube material from the production process. For the Baytubes® C 150 P used, a purity of >95% by weight is indicated on the associated data sheet. Analysis of the Baytubes® C 150 P carbon nanotube substrate indicated the following impurities: Co 2200 ppm, Mn 2500 ppm, Al 1800 ppm, Mg 2200 ppm. Halogens and sulfur and also nitrate were undetectable, i.e. present in a proportion of at least less than 5 ppm.

The content of soluble metals and cations was determined as follows: a sample of the carbon nanotube powder was extracted with 0.8 N aqueous nitric acid at 70° C. for 4 hours. The metal ion concentration in the extract obtained was determined by means of atomic emission spectroscopy and converted back to the carbon nanotube powder used.

The content of sulfate ions was determined as follows: a sample of the carbon nanotube power was extracted with 0.8 N aqueous nitric acid at 70° C. for 4 hours. The sulfate ion concentration was determined as sulfur in the extract obtained by means of atomic emission spectroscopy and converted back to the carbon nanotube powder used.

The content of chloride ions was determined as follows: a sample of the carbon nanotube powder was extracted with 0.8 N aqueous nitric acid at 70° C. for 4 hours. The chloride ion concentration in the extract obtained was determined by means of titration and converted back to the carbon nanotube powder used.

The content of fluoride ions was determined as follows. A sample of the carbon nanotube powder was extracted with 0.8 N aqueous nitric acid at 70° C. for 4 hours. The fluoride ion concentration in the extract obtained was determined by means of an ion-selective electrode and converted back to the carbon nanotube powder used.

The content of nitrate ions was determined as follows: a sample of the carbon nanotube powder was eluted with alkaline aqueous solution (pH 10-11) in an ultrasonic bath for 10 minutes and the nitrate ion concentration in the eluate obtained was determined by means of ion chromatography and converted back to the carbon nanotube powder used.

EXAMPLES

Example 1

20 g of carbon nanotube powder were extracted with 100 ml of aqueous 10% strength by weight hydrochloric acid at 70° C. for 4 hours. The carbon nanotube powder was subsequently filtered off and washed with deionized water until the filtrate displayed a pH of >6. The further processing was carried out by different process routes a) to h) described below, both in a manner according to the invention and also in a manner not according to the invention:

a) Not according to the invention: the powder was dried at 100° C. to a residual water content of <0.3% by weight and analyzed. The analysis gave the following results: Co 27 ppm, Mn 25 ppm, Al 87 ppm, Mg 30 ppm and Cl 960 ppm.

b) Not according to the invention: 1 g of the powder from 1a) was eluted 4 times with 100 ml of deionized water at room temperature for 10 minutes, filtered, dried at 100° C. to a residual water content of <0.3% by weight and analyzed. The analysis gave the following result: 920 ppm of chloride.

c) According to the invention: 1 g of the powder from experiment 1a) was eluted after drying with 20 ml of 0.1% strength by weight sodium hydroxide solution at room temperature for 10 minutes and subsequently washed 3 times with 100 ml of deionized water, so that the pH of the filtrate was <8. The powder was filtered off, dried at 100° C. to a residual water content of <0.3% by weight and analyzed. The analysis indicated 145 ppm of chloride and 13 ppm of sodium.

d) According to the invention: 1 g of the powder from experiment 1a) was eluted after drying with 20 ml of 0.1% strength by weight potassium hydroxide solution at room temperature for 10 minutes and subsequently washed 3 times with 100 ml of deionized water, so that the pH of the filtrate was <8. The powder was filtered off, dried at 100° C. to a residual water content of <0.3% by weight and analyzed. The analysis indicated 390 ppm of chloride and 10 ppm of potassium.

e) According to the invention: 1 g of the powder from experiment 1a) was eluted after drying with 20 ml of 0.1% strength by weight lithium hydroxide solution at room temperature for 10 minutes and subsequently washed 3 times with 100 ml of deionized water, so that the pH of the filtrate was <8. The powder was filtered off, dried at 100° C. to a residual water content of <0.3% by weight and analyzed. The analysis indicated 280 ppm of chloride and 9 ppm of lithium.

f) According to the invention: 1 g of the powder from experiment 1a) was eluted after drying with 100 ml of 1% strength by weight citric acid solution at room temperature for 10 minutes and subsequently washed 3 times with 100 ml of deionized water, so that the pH of the filtrate was >6. The powder was filtered off, dried at 100° C. to a residual water content of <0.3% by weight and analyzed. The analysis indicated 300 ppm of chloride.

g) According to the invention: 1 g of the powder from experiment 1a) was eluted after drying with 100 ml of 1% strength by weight potassium fluoride solution at room temperature for 10 minutes and subsequently washed 3 times with 100 ml of deionized water, so that the pH of the filtrate was <8. The powder was filtered off, dried at 100° C. to a residual water content of <0.3% by weight and analyzed. The analysis indicated 300 ppm of chloride and 400 ppm of fluoride.

h) According to the invention: 1 g of the powder from experiment 1a) was eluted after drying with 100 ml of 1% strength by weight potassium hexafluorophosphate solution at room temperature for 10 minutes and subsequently washed 3 times with 100 ml of deionized water, so that the pH of the filtrate was <8. The powder was filtered off, dried at 100° C. to a residual water content of <0.3% by weight and analyzed. The analysis indicated 400 ppm of chloride and 1500 ppm of fluorine (as hexafluorophosphate).

Example 2

20 g of the carbon nanotube powder were extracted with 150 ml of aqueous 5% strength by weight sulfuric acid at 70° C. for 4 hours. The CNT powder was subsequently filtered off and washed with deionized water until the filtrate displayed a pH of >6. The further processing was carried out by various routes a) to c) described below, both in a manner according to the invention and a manner not according to the invention:

a) Not according to the invention: the powder was dried at 100° C. to a residual water content of <0.3% by weight and analyzed. The analysis gave the following results: Co 28 ppm, Mn 30 ppm, Al 110 ppm, Mg 33 ppm and S 870 ppm (2610 ppm of sulfate).
b) Not according to the invention: 1 g of the powder from experiment 2a) was eluted 4 times with 100 ml of deionized water at room temperature for 10 minutes, filtered, dried at 100° C. to a residual water content of <0.3% by weight and analyzed. The analysis indicated 790 ppm of sulfur (2370 ppm of sulfate).
c) According to the invention: 1 g of the powder from experiment 2a) was eluted after drying with 2×20 ml of 0.1% strength by weight sodium hydroxide solution at room temperature for 10 minutes and subsequently washed 3 times with 100 ml of deionized water, so that the pH of the filtrate was <8. The powder was filtered off, dried at 100° C. to a residual water content of <0.3% by weight and analyzed. The analysis indicated 63 ppm of sulfur (189 ppm of sulfate) and 50 ppm of sodium.

Example 3

20 g of carbon nanotube powder were extracted with 200 ml of aqueous 5% strength by weight nitric acid at 70° C. for 4 hours. The CNT powder was subsequently filtered off and washed with deionized water until the filtrate displayed a pH of >6. The further processing was carried out by various routes a) to c) described below, both in a manner according to the invention and in a manner not according to the invention:

a) Not according to the invention: the powder was dried at 100° C. to a residual water content of <0.3% by weight and analyzed. The analysis gave the following results: Co 61 ppm, Mn 78 ppm, Al 320 ppm, Mg 86 ppm and nitrate 1300 ppm.
b) Not according to the invention: 1 g of the powder from experiment 3a) was eluted 4 times with 100 ml of deionized water at room temperature for 10 minutes, filtered, dried at 100° C. to a residual water content of <0.3% by weight and analyzed. The analysis indicated 1090 ppm of nitrate.
c) According to the invention: 1 g of the powder from experiment 3a) was eluted after drying with 20 ml of 0.1% strength by weight potassium hydroxide solution at room temperature for 10 minutes and subsequently washed 3 times with 100 ml of deionized water, so that the pH of the filtrate was <8. The powder was filtered off, dried at 100° C. to a residual water content of <0.3% by weight and analyzed. The analysis indicated 490 ppm of nitrate and 77 ppm of potassium.

The above-described examples and experiments show that the first washing b) with an aqueous acid and the subsequent washing with a particular aqueous solution as per one of the above-described processes make it possible to provide carbon nanotube substrates which have a high purity or a good impurity profile, i.e. both a very low metal ion concentration and also a very low anion concentration, in particular in respect of types of anion which are disadvantageous for some applications. In particular, carbon nanotube substrates which satisfy the demanding purity requirements for particular electronic applications, for example in the production of rechargeable lithium ion batteries, were obtained in this way.

The invention claimed is:

1. A process for cleaning carbon nanotubes, comprising at least the following steps:

a) providing a carbon nanotube substrate comprising carbon nanotubes,
b) first washing of the carbon nanotube substrate with an acid, where the acid has at least one type of acid anions A1, and
b2) optionally intermediate washing of the product from step b) with an additive-free solvent, and
c) second washing of the carbon nanotube substrate with a solution, wherein the solution comprises replacement anions A2 of at least one type different from the acid anions A1 of the acid in step b) and the mole fraction of the replacement anions A2 in the solution is greater than the mole fraction of acid anions A1 in the solution, and
c2) optionally further washing of the product from step c) with additive-free solvent, and
d) isolating the carbon nanotubes.

2. The process as claimed in claim 1, wherein the mole fraction of the replacement anions A2 based on the totality of the anions A1 and A2 in the solution for step c) is more than 50 mol %.

3. The process as claimed in claim 1, wherein an alkali solution or a salt solution is used as solution for the second washing in step c).

4. The process as claimed in claim 1, wherein the solution for the second washing c) comprises replacement anions A2 of at least one type selected from the group consisting of fluoride- or fluorine-containing anions, phosphorus-containing anions, boron-containing anions, and mixtures thereof.

5. The process as claimed in claim 1, wherein an aqueous alkali metal hydroxide or alkaline earth metal hydroxide solution is used as solution for the second washing c).

6. The process as claimed in claim 1, wherein the solution for the second washing c) comprises a cation of at least one type selected from the following group consisting of cations of ammonium compounds, alkali metal cations, alkaline earth metal cations, and a mixture thereof.

7. The process as claimed in claim 1, wherein at least one solvent for the second washing c) is selected from the group consisting of water, alcohols, ethers, ketones, nitriles, amides, halogenated compounds and esters, and mixtures thereof.

8. The process as claimed in claim 1, wherein the solution for the second washing c) has a molar concentration of from 0.0001 to 10 mol/l.

9. The process as claimed in claim 1, wherein the acid for the first washing b) is an aqueous organic acid or a mineral acid.

10. The process as claimed in claim 1, wherein the acid for the first washing b) is an aqueous acid having a concentration of >1% by weight.

11. The process as claimed in claim 1, wherein the carbon nanotubes in the carbon nanotube substrate are present in agglomerated form.

12. The process as claimed in claim 1, wherein the total metal ion concentration in the carbon nanotube substrate after the first washing or before the second washing is less than 2000 ppm and/or based on each individual type of metal ion is less than 200 ppm.

13. The process as claimed in claim 1, wherein the process comprises an intermediate washing b2) between the first washing b) and the second washing c) and/or a third washing c2) after the second washing c), wherein the intermediate washing b2) or the third washing c2) is carried out using a pH-neutral solution.

14. The process as claimed in claim 1, wherein the carbon nanotube substrate is dried in a drying step after the second washing c) and/or after a third washing c2).

15. The process as claimed in claim 1, wherein the first washing b) is carried out at a temperature of at least 10° C.

16. The process as claimed in claim 1, wherein the first washing b) is carried out over a time of from 0.25 to 48 hours.

17. A carbon nanotube substrate obtained by the process as claimed in claim 1, wherein the concentration of nitrate ions, chloride ions and sulfate ions in the carbon nanotube substrate is in each case independently less than 900 ppm.

18. A method comprising utilizing the carbon nanotube substrate as claimed in claim 17 for producing composites for packaging or transport materials for electronic components or for producing batteries, in particular rechargeable lithium ion batteries, for producing electrodes for electrochemical processes or for producing fuel cells.

* * * * *